United States Patent
Jang

(10) Patent No.: US 9,573,555 B2
(45) Date of Patent: Feb. 21, 2017

(54) AIR BAG MODULE

(71) Applicant: Hyundai Mobis Co., Ltd., Seoul (KR)

(72) Inventor: Rae Ick Jang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 65 days.

(21) Appl. No.: 14/622,486

(22) Filed: Feb. 13, 2015

(65) Prior Publication Data

US 2015/0321636 A1  Nov. 12, 2015

(30) Foreign Application Priority Data

May 8, 2014 (KR) .................. 10-2014-0054786

(51) Int. Cl.
*B60R 21/2338* (2011.01)
*B60R 21/235* (2006.01)
*B60R 21/233* (2006.01)

(52) U.S. Cl.
CPC ......... *B60R 21/2338* (2013.01); *B60R 21/233* (2013.01); *B60R 21/235* (2013.01); *B60R 2021/23308* (2013.01); *B60R 2021/23382* (2013.01); *B60R 2021/23386* (2013.01); *B60R 2021/23576* (2013.01)

(58) Field of Classification Search
CPC .......... B60R 2021/23382; B60R 2021/23386; B60R 21/2338; B60R 21/233; B60R 2021/23308
See application file for complete search history.

(56) References Cited

U.S. PATENT DOCUMENTS

| | | | | |
|---|---|---|---|---|
| 7,328,915 B2* | 2/2008 | Smith | ................ | B60R 21/2338 280/739 |
| 7,651,130 B2* | 1/2010 | Bauberger | .......... | B60R 21/2338 280/743.2 |
| 7,878,538 B2* | 2/2011 | Abe | ..................... | B60R 21/2338 280/736 |
| 8,226,118 B2* | 7/2012 | Rose | ................... | B60R 21/2338 280/743.2 |
| 9,027,962 B1* | 5/2015 | Jang | ...................... | B60R 21/239 280/743.1 |
| 9,150,186 B1* | 10/2015 | Belwafa | ................ | B60R 21/233 |
| 9,150,189 B1* | 10/2015 | Nelson | ............... | B60R 21/2338 |
| 9,205,798 B1* | 12/2015 | Jindal | ..................... | B60R 21/16 |
| 9,352,721 B2* | 5/2016 | Jang | ...................... | B60R 21/239 |
| 9,376,084 B2* | 6/2016 | Choi | ..................... | B60R 21/233 |
| 9,499,118 B2* | 11/2016 | Jindal | ................... | B60R 21/231 |
| 2009/0289444 A1* | 11/2009 | Keshavaraj | ......... | B60R 21/2338 280/736 |
| 2013/0147171 A1* | 6/2013 | Shin | .................... | B60R 21/2338 280/743.2 |

(Continued)

FOREIGN PATENT DOCUMENTS

KR  10-2013-0062521  6/2013

*Primary Examiner* — Paul N Dickson
*Assistant Examiner* — Joselynn Y Sliteris
(74) *Attorney, Agent, or Firm* — H.C. Park & Associates, PLC

(57) ABSTRACT

An air bag module, including: an air bag cushion including a front panel and side panels; at least two pockets disposed on the side panels and protruding toward the outside of each of the side panels, when the air bag cushion is unfolded; and an internal horizontal tether crossing an interior of the air bag cushion and having both ends connected to the pockets.

10 Claims, 4 Drawing Sheets

(56) References Cited

U.S. PATENT DOCUMENTS

2016/0096503 A1* 4/2016 Lee ................... B60R 21/231
                                                                   280/743.2
2016/0121839 A1* 5/2016 Ko .................... B60R 21/233
                                                                   280/730.1

* cited by examiner

AIR BAG MODULE

CROSS-REFERENCE TO RELATED APPLICATION

This application claims priority from and the benefit of Korean Patent Application No. 10-2014-0054786, filed on May 8, 2014, which is hereby incorporated by reference for all purposes as if fully set forth herein.

BACKGROUND

Field

Exemplary embodiments relate to an air bag module. More particularly, exemplary embodiments relate to an air bag module having pockets provided at both side panels of an air bag and having internal horizontal tethers provided inside the pockets.

Discussion of the Background

Generally, a vehicle includes an air bag apparatus, which is a safety apparatus for protecting passengers by expanding an air bag cushion with gas introduced from an inflator at the time of a vehicle accident.

The air bag apparatus may be equipped at several portions of a vehicle, if necessary. As the air bag apparatus, there have been proposed a driver air bag apparatus equipped in a steering wheel to protect a vehicle passenger which is seated in a driver's seat; a passenger airbag apparatus equipped at an upper portion of a glove box to protect a passenger seated in a passenger seat; a curtain air bag apparatus mounted along a loop rail to protect a side of a passenger; etc.

These air bag apparatuses each include an inflator that generates gas, and an air bag cushion connected to the inflator to be expanded and unfolded while being introduced with gas to protect a passenger.

An air bag that has been currently developed uses various kinds of tethers. The air bag includes a vertical tether positioned at the front of a main panel, an internal horizontal tether connecting air bag side panels to each other, a cross tether connecting the internal horizontal tether to the vertical tether, and the like. The existing tethers have been used to improve a shape of the air bag or improve a flow of the airbag after the air bag is unfolded.

The existing air bag tethers, however, fail to sufficiently address limiting the movement of a vehicle passenger at the time of a head-on collision of a vehicle, and thus, have a minimal injury reduction effect. The existing tethers also fail to address limiting the movement of a vehicle passenger at the time of an oblique collision of a vehicle, thereby failing to prevent undesirable separation of a vehicle passenger from the air bag cushion.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention are directed to limiting undesirable head movement of a vehicle passenger by a tension of an internal horizontal tether connected to a pocket at the time of a head-on collision of a vehicle, in order to reduce an injury to the head and neck.

Exemplary embodiments of the present invention are also directed to using pockets at the sides of the airbag at the time of an oblique collision to prevent a vehicle passenger from contacting a vehicle body and undesirably separating from an air bag.

Additional aspects will be set forth in the detailed description which follows, and, in part, will be apparent from the disclosure, or may be learned by practice of the inventive concept.

Exemplary embodiments provide an air bag module, including: an air bag cushion including a front panel and side panels; at least two pockets provided on the side panels and protruding toward the outside of each of the side panels when the air bag cushion is in an unfolded state; and an internal horizontal tether crossing an interior of the air bag cushion and having both ends connected to the pockets.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
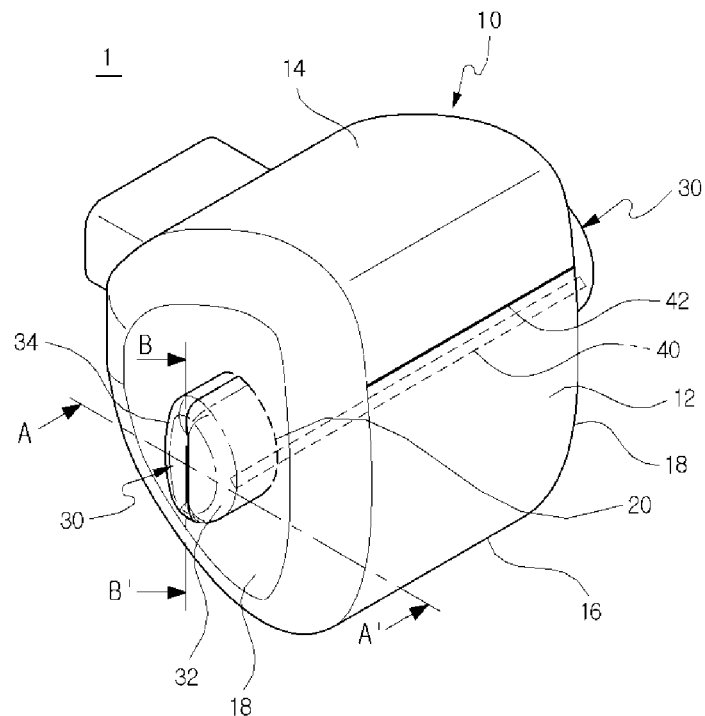
FIG. 1 is a perspective view of an unfolded state of an air bag module according to an exemplary embodiment of the present invention.

Hereinafter, an air bag module according to exemplary embodiments of the present invention will be described in detail with reference to the accompanying drawings. It is to be noted that in giving reference numerals to components of each of the accompanying drawing, like reference numerals refer to like elements even though the like components are shown in different drawings. Although exemplary embodiments of the present invention will be described below, the spirit of the present invention is not limited thereto, but may be variously modified by those skilled in the art. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
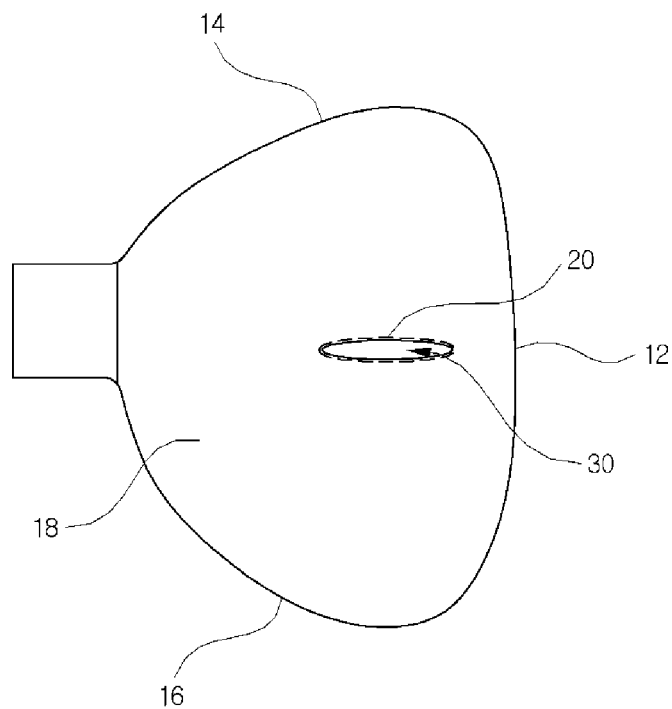
FIG. 2 is a diagram illustrating a coupled state between a pocket and a side panel which is viewed from an outer side of a side panel, in a folded state of the air bag module.
Figure 3:
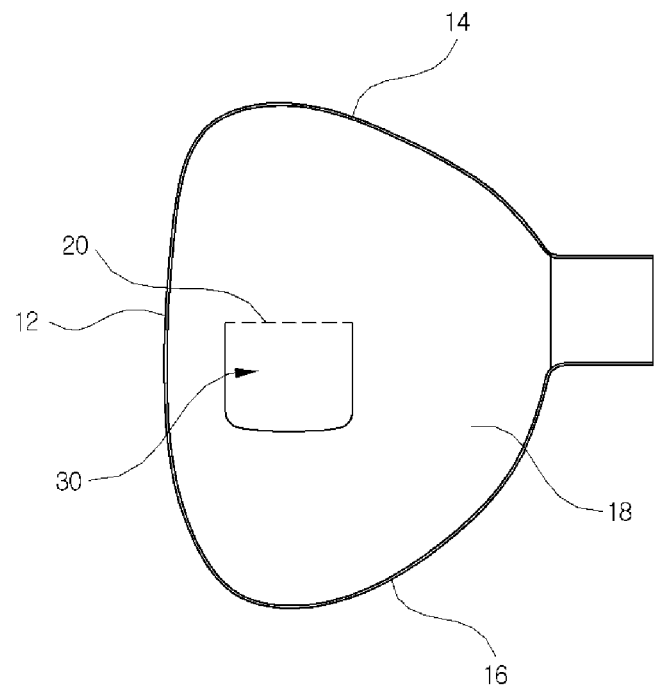
FIG. 3 is a diagram illustrating the coupled state between the pocket and the side panel which is viewed from an inner side of the side panel, in the folded state of the air bag module.

Referring to FIGS. 1 to 3, an air bag module 1 according to an exemplary embodiment of the present invention includes an air bag cushion 10, pockets 30, an internal horizontal tether 40, and an external horizontal tether 42.

The air bag cushion 10 includes a gas inlet (not illustrated) into which gas is introduced at the time of a vehicle collision, a front panel 12 with which a vehicle passenger collides, a top panel 14, a bottom panel 16, and side panels 18 provided at both sides of the front panel 12.

As illustrated in FIG. 1, the pockets 30 are positioned at both side panels 18 and are formed to protrude toward the outside of the air bag cushion 10 when the air bag cushion 10 is unfolded.

In an exemplary embodiment of the pocket 30, the pockets 30 are each provided on the side panels 18 of the air bag cushion 10 and may be coupled with the side panels 18 of the air bag cushion 10 by a sewing line 20. In this case, the pocket 30 may be coupled with the side panels 18 by various methods.

When the air bag cushion 10 is expanded, the pocket 30 may have a shape which protrudes toward the outside of the side panel 18. The pocket 30 may have a shape in which edges of a first surface 32 and a second surface 34 of the pocket having a rectangular sectional shape are sewed. The pocket 30 may have various shapes, such as a cylindrical shape, a polygonal pillar shape, and a tube shape, and therefore, the shape of the pocket 30 is not limited.

Referring to FIGS. 2 and 3 illustrating the folded state of the air bag cushion 10, as exemplified by the coupled state of the pocket 30, it may be appreciated that the pocket 30 is depressed into the side panel 18 so as not to be visible when the pocket 30 is observed from the outside of the side panel 18 and the pocket 30 is sewed when the pocket 30 is observed from the inside thereof. However, the pocket 30 may also be sewed to be observed from the outside of the side panel 18, and the position of the pocket 30 is, therefore, not limited.

The structure of the pocket 30 allows the pocket 30 to protrude by being expanded toward the outside of the side panel 18 of the air bag cushion 10 when being introduced with gas from the gas inlet at the time of a vehicle collision.

The internal horizontal tether 40 crosses an inside of the air bag cushion 10, and is coupled with the pockets 30 formed at both side panels 18. When the pocket 30 protrudes as a result of the unfolding of the air bag cushion 10, tension is applied to the internal horizontal tether 40 by the protrusion of the pocket 30 toward the outside of the side panel 18, thereby limiting movement of the vehicle passenger to the front at the time of the vehicle collision by a support force generated from the tension.

An external horizontal tether 42 is provided on the front panel 12 of the air bag cushion 10. Like the internal horizontal tether 40, the external horizontal tether 42 enhances the unfolding performance and shape of the air bag cushion 10, and serves to primarily control the vehicle passenger when the air bag cushion 10 is unfolded as a result of vehicle collision.

The internal horizontal tether 40 and the external horizontal tether 42 may be configured as a string or a band. However, the mounting purpose of the internal horizontal tether 40 is to prevent the vehicle passenger from excessively invading into the air bag cushion 10 and thereby causing separation of the air bag cushion 10. Meanwhile, when an area of the internal horizontal tether 40 is excessive or a thickness thereof is relatively large, a distortion of the internal horizontal tether 40 is reduced, thereby preventing tensile force applied to the internal horizontal tether 40 from lessening when the pocket 30 is expanded.

Figure 4:
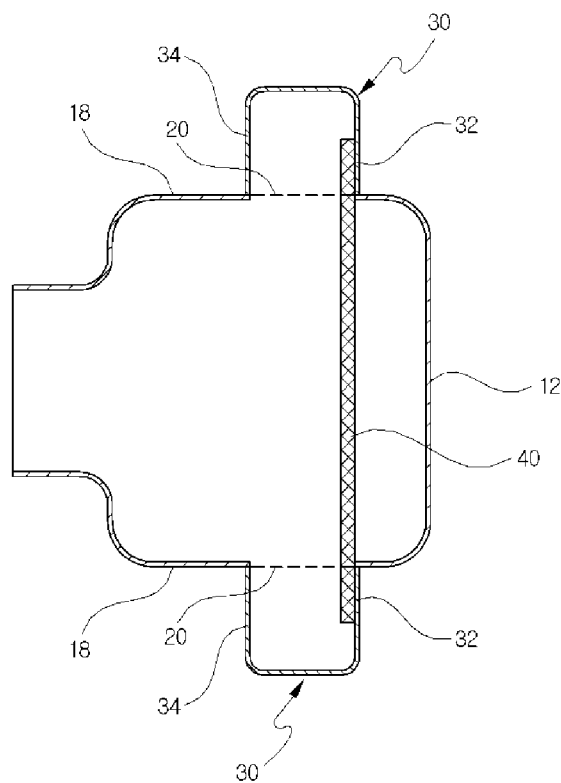
FIG. 4 is a cross-sectional view taken along the horizontal plane defined by line A-A' of FIG. 1.

FIG. 4 is a cross-sectional view taken along the horizontal plane defined by line A-A' of FIG. 1, which is the air bag module 1 according to the exemplary embodiment of the present invention.

Referring to FIG. 4, in order for the internal horizontal tether 40 to effectively deliver the necessary support force to the vehicle passenger through tensile force applied by expanding the pocket 30, the internal horizontal tether 40 may be mounted on a surface of the pocket 30 adjacent to the front panel 12 of the air bag cushion 10.

In an exemplary embodiment, the pocket 30 includes the first surface 32 of the pocket adjacent to the air bag cushion 10 and the second surface 34 of the pocket facing the first surface 32 of the pocket 30, and the internal horizontal tether 40 may be mounted on the first surface 32 of the pocket 30 adjacent to the front panel 12 of the air bag cushion 10.

When the vehicle passenger is pushed into the air bag cushion 10 at the time of the vehicle collision, the internal horizontal tether 40 coupled with the first surface 32 adjacent to the pocket 30 contacts the vehicle passenger, and the internal horizontal tether 40 applied with the tensile force by the expansion of the pocket 30 may impede a speed of the passenger moving toward the front surface of the vehicle.

Figure 5:
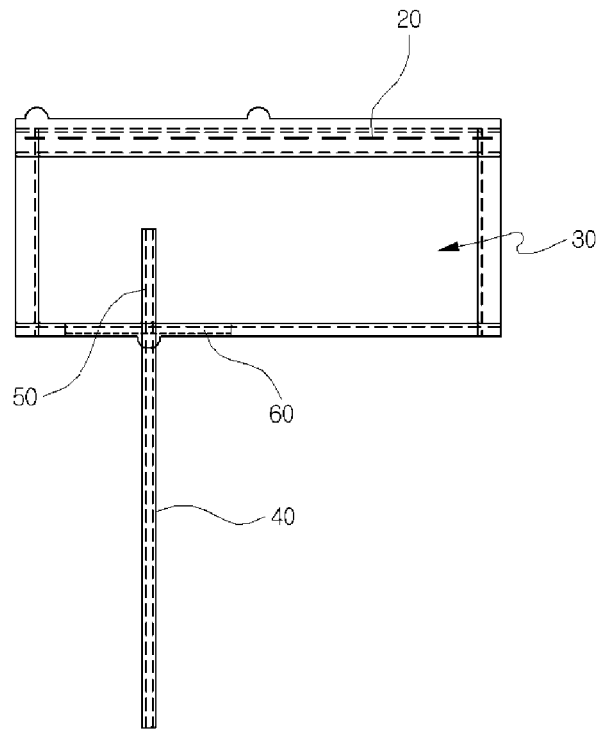
FIG. 5 is a diagram illustrating a coupled state between a horizontal tether and one of the pockets.

FIG. 5 is a diagram illustrating a coupled state between the horizontal tether 40 and the pocket 30 in the air bag module 1 according to the exemplary embodiment of the present invention.

Referring to FIG. 5, a pocket coupling part 50, which is a section of the internal horizontal tether 40, is coupled with the pocket 30. In this exemplary embodiment, the pocket coupling part 50 may be sewed on the pocket 30, but may be coupled therewith by various methods.

To fix the pocket coupling part 50 to the pocket 30, a tether fixing part 60 is provided at the pocket coupling part 50 so that the tether fixing part 60 intersects the pocket coupling part 50 at an end of the internal horizontal tether 40 coupled with the pocket 30. For example, the tether fixing part 60 may be coupled with the pocket 30 by sewing, tape, adhesive, and the like. The tether fixing part 60 prevents the pocket coupling part 50 coupled with the pocket 30 from separating or ripping from the pocket 30 when the pocket 30 is expanded.

Figure 6:
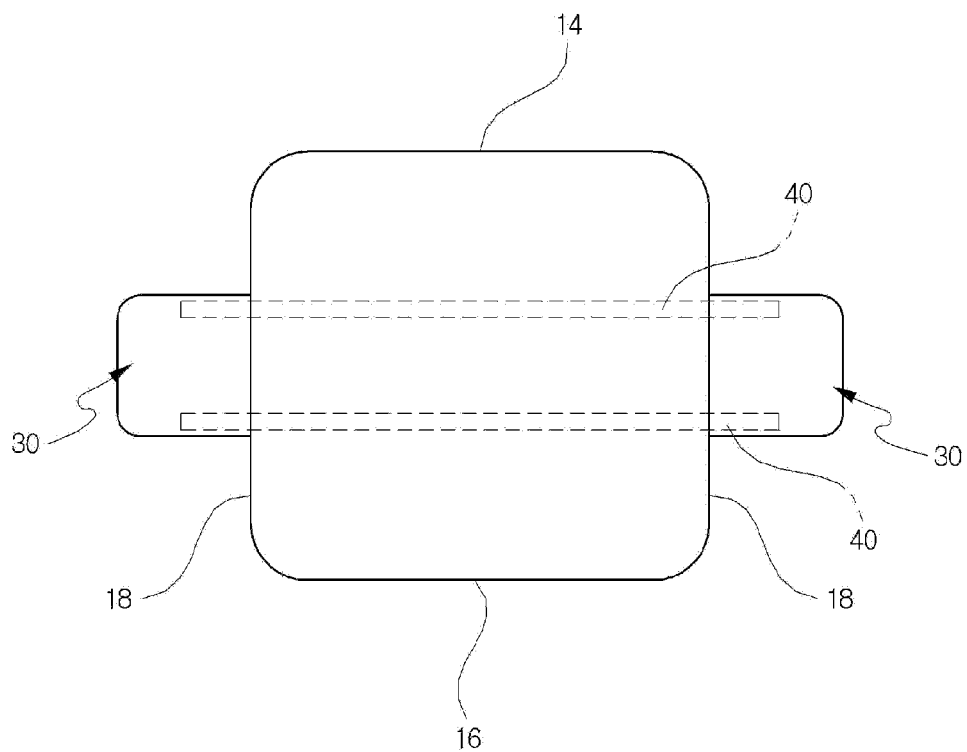
FIG. 6 is a cross-sectional view taken along the vertical plane defined by line B-B' of FIG. 1, including a plurality of horizontal tethers.

FIG. 6 is a cross-sectional view taken along the horizontal plane defined by line B-B' of FIG. 1 in which a plurality of horizontal tethers 40 are included in the air bag module 1 according to an exemplary embodiment of the present invention.

Referring to FIG. 6, a plurality of internal horizontal tethers 40 may be provided. The plurality of internal horizontal tethers 40 may be mounted to have different lengths, or the plurality of internal horizontal tethers 40 may be made of different materials.

A plurality of external tethers 42 similar to the external tether 42 shown in FIG. 1 may be provided on the front panel 12 of the air bag cushion 10.

When the pocket 30 is expanded due to unfolding the air bag cushion 10, different tensions may be applied to the internal horizontal tethers 40, and thus, the plurality of internal horizontal tethers 40 which are mounted to have different lengths may control the amount and speed of the vehicle passenger which may hit the air bag cushion 10.

When the pocket 30 is expanded while unfolding the air bag cushion 10, the different tension at different parts of the airbag cushion 10 occur due to a difference in distortions of the internal horizontal tethers 40. Thus, the plurality of internal horizontal tethers 40, which are made of different materials, may control the amount and speed of the vehicle passenger which may hit the air bag cushion 10.

In an exemplary embodiment, even though the vehicle passenger is supported by a seat belt of a vehicle at the time of the vehicle collision, a head and a body of the vehicle passenger rotate about the hip of the vehicle passenger. Because a greater centrifugal force is applied to the head portion, which is relatively far away from the center of rotation, in order to increase the tensile force of the internal horizontal tether 40, the length of the internal horizontal tether 40 which is disposed at an upper portion of the air bag cushion 10 may be shorter than the internal horizontal tether 40 disposed at the center portion of the air bag cushion 10, or the internal horizontal tether 40 may be made of a material having low distortion.

Figure 7:
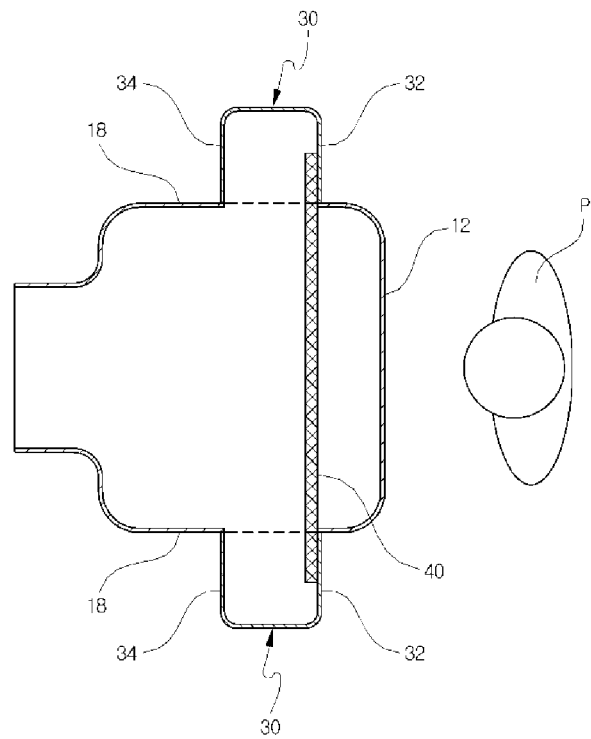
FIG. 7 is a cross-sectional view taken along the horizontal plane defined by line A-A' of FIG. 1 before a vehicle passenger collides with an air bag cushion.
Figure 8:
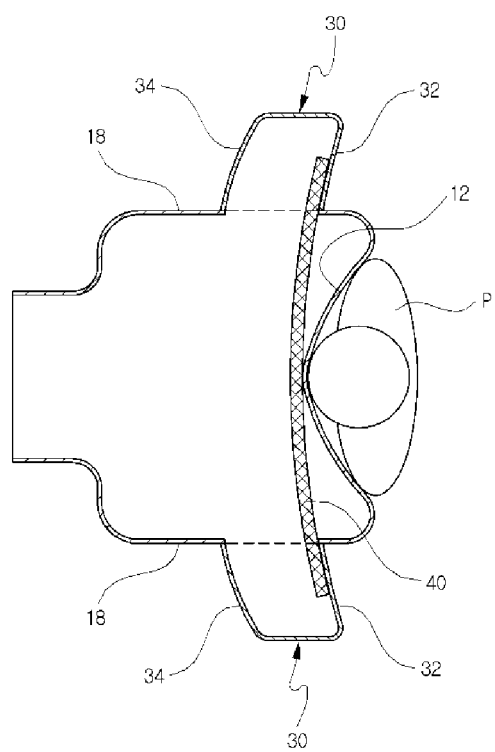
FIG. 8 is a cross-sectional view taken along the horizontal plane defined by line A-A' of FIG. 1 after the vehicle passenger collides with the air bag cushion.

FIG. 7 is a cross-sectional view taken along the horizontal plane defined by line A-A' of FIG. 1 before the vehicle passenger collides with the air bag cushion 10, and FIG. 8 is a cross-sectional view taken along the horizontal plane defined by line A-A' of FIG. 1 after the vehicle passenger collides with the air bag cushion 10.

Referring to FIGS. 7 and 8, when a vehicle passenger P collides with the air bag cushion 10, the passenger P is pushed into the air bag cushion 10. In this case, an air pressure inside the air bag cushion 10 is increased, and thus, a pressure of the pockets 30 provided at both sides of the side panel 18 is also increased. The tensile force applied to the horizontal tether 40 is increased as a result of the increased pressure of the pocket 30, and a size of the tensile force applied to the horizontal tether 40 may be increased and reduced depending on collision strength of the vehicle passenger P.

The pocket 30 connected to the internal horizontal tether 40 is expanded at the time of an oblique collision of the vehicle, and thus, the tension of the internal horizontal tether 40 is increased, such that the internal horizontal tether 40 firmly holds the pocket 30. Therefore, even after the vehicle passenger P collides with an edge of the air bag cushion 10, the internal horizontal tether 40 contacts the pocket 30 to prevent the head of the vehicle passenger P from separating. In this case, an "oblique collision" is defined as the passenger P colliding with the air bag cushion 10 in an oblique direction at the time of the side collision of the vehicle.

The height of the pocket 30 in the vehicle may be adjusted depending on a sitting height of the vehicle passenger P.

According to the air bag module 1 in accordance with the exemplary embodiments of the present invention, it is possible to reduce the possibility or severity of injury to a passenger by making the internal horizontal tether 40 included in the pocket 30 limit the movement of the head of the vehicle passenger at the time of a head-on collision.

It is also possible to prevent the vehicle passenger from separating from the air bag cushion 10 by using the pocket 30 and the internal horizontal tether 40 at the time of the oblique collision.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An air bag module, comprising:
    an air bag cushion comprising a front panel and side panels;
    at least two closed pockets disposed on the side panels and protruding toward the outside of each of the side panels, when the air bag cushion is in an unfolded state; and
    an internal horizontal tether crossing an interior of the airbag cushion, a first end of the internal horizontal tether connected to a first pocket and a second end of the internal horizontal tether connected to a second pocket,
    wherein the internal horizontal tether is fixed to the airbag cushion only at each of the pockets.

2. The air bag module of claim 1, wherein:
    each of the pockets has a rectangular sectional shape and comprises a first surface disposed adjacent to the front panel and a second surface facing the first surface; and
    each end of the internal horizontal tether is mounted at the first surface of the respective pocket.

3. The air bag module of claim 1, further comprising pocket coupling parts disposed at both ends of the internal horizontal tether that are fixed to the pockets.

4. The air bag module of claim 3, further comprising a tether fixing part intersecting each of the pocket coupling parts and configured to fix the pocket coupling parts to the pockets.

5. The air bag module of claim 1, wherein the internal horizontal tether comprises a string or a band.

6. The air bag module of claim 1, wherein a plurality of the internal horizontal tethers are disposed in the interior of the air bag cushion and are spaced apart from each other.

7. The air bag module of claim 6, wherein the internal horizontal tethers have different lengths from each other.

8. The air bag module of claim 6, wherein the internal horizontal tethers are made of different materials having different distortion characteristics.

9. The air bag module of claim 1, further comprising an external horizontal tether disposed on the front panel of the air bag cushion.

10. The air bag module of claim 1, further comprising a plurality of external horizontal tethers disposed on the front panel of the air bag cushion.

* * * * *